(12) United States Patent
Staudinger et al.

(10) Patent No.: US 8,784,267 B2
(45) Date of Patent: Jul. 22, 2014

(54) METHOD FOR CONTROLLING A ROLLING OR COASTING FUNCTION OF A VEHICLE

(75) Inventors: Joachim Staudinger, Ravensburg (DE); Maik Wurthner, Markdorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 208 days.

(21) Appl. No.: 13/505,533

(22) PCT Filed: Oct. 11, 2010

(86) PCT No.: PCT/EP2010/065153
§ 371 (c)(1),
(2), (4) Date: May 2, 2012

(87) PCT Pub. No.: WO2011/054621
PCT Pub. Date: May 12, 2011

(65) Prior Publication Data
US 2012/0220424 A1    Aug. 30, 2012

(30) Foreign Application Priority Data
Nov. 3, 2009    (DE) .................. 10 2009 046 340

(51) Int. Cl.
*B60W 10/02*    (2006.01)
*F16H 59/66*    (2006.01)

(52) U.S. Cl.
USPC ................ 477/175; 477/120; 701/65; 701/93

(58) Field of Classification Search
USPC ............. 477/118, 120, 175; 180/170; 701/65, 701/93, 94, 95
See application file for complete search history.

(56) References Cited

U.S. PATENT DOCUMENTS

| | | | |
|---|---|---|---|
| 5,508,916 A * | 4/1996 | Markyvech et al. | 701/51 |
| 6,687,607 B2 | 2/2004 | Graf et al. | |
| 6,926,638 B1 | 8/2005 | Gimmler et al. | |
| 6,939,265 B2 | 9/2005 | Rustige et al. | |
| 6,951,525 B2 | 10/2005 | Ries-Mueller | |
| 7,223,204 B2 * | 5/2007 | Steen et al. | 477/97 |
| 7,509,202 B2 | 3/2009 | Scelers | |
| 7,987,034 B2 | 7/2011 | Taffin | |
| 8,332,120 B2 * | 12/2012 | Bjernetun et al. | 701/93 |
| 2010/0324793 A1 | 12/2010 | Winkel | |
| 2012/0220422 A1 * | 8/2012 | Wurthner et al. | 477/79 |
| 2013/0030668 A1 * | 1/2013 | Eriksson et al. | 701/94 |

FOREIGN PATENT DOCUMENTS

| | | |
|---|---|---|
| DE | 197 00 325 A1 | 7/1997 |
| DE | 199 20 065 A1 | 12/2000 |
| DE | 102 21 701 A1 | 11/2002 |
| DE | 101 51 933 A1 | 9/2003 |

(Continued)

*Primary Examiner* — Roger Pang
(74) *Attorney, Agent, or Firm* — Davis & Bujold, PLLC; Michael J. Bujold

(57) ABSTRACT

A method of controlling a rolling or a coasting function of a vehicle, such as a commercial vehicle, having a drive train including a drive motor, an automatic or automated transmission that is controllable by transmission controls, a controllable shifting mechanism for interrupting the flow of power in the drive train, and a driving speed control device. The flow of power in the drive train is interrupted in a suitable driving situation. In order for the rolling or the coasting function to be exploited as efficiently as possible, and still be terminated safely and comfortably, the flow of power in the drive train is restored depending on a selectable difference in speed ($\Delta v\_F\_T$) between the current vehicle speed ($v\_F$) and a speed limit ($v\_T$) set by the driving speed control device.

18 Claims, 1 Drawing Sheet

(56) References Cited

FOREIGN PATENT DOCUMENTS

| | | |
|---|---|---|
| DE | 10 2004 017 115 A1 | 10/2005 |
| DE | 10 2007 001 936 A1 | 10/2007 |
| DE | 10 2007 036 794 A1 | 2/2009 |
| DE | 10 2008 023 135 A1 | 11/2009 |
| EP | 1 270 303 A2 | 1/2003 |
| EP | 1 923 291 A2 | 5/2005 |
| FR | 2 847 639 A1 | 5/2004 |
| FR | 2 851 629 A1 | 8/2004 |
| GB | 2 452 579 A | 3/2009 |
| WO | 02/099301 A1 | 12/2002 |
| WO | 03/037672 A1 | 5/2003 |
| WO | 2005/084995 A1 | 9/2005 |
| WO | 2006/107267 A1 | 10/2006 |
| WO | 2008/130288 A1 | 10/2008 |
| WO | 2009/037167 A1 | 3/2009 |

* cited by examiner

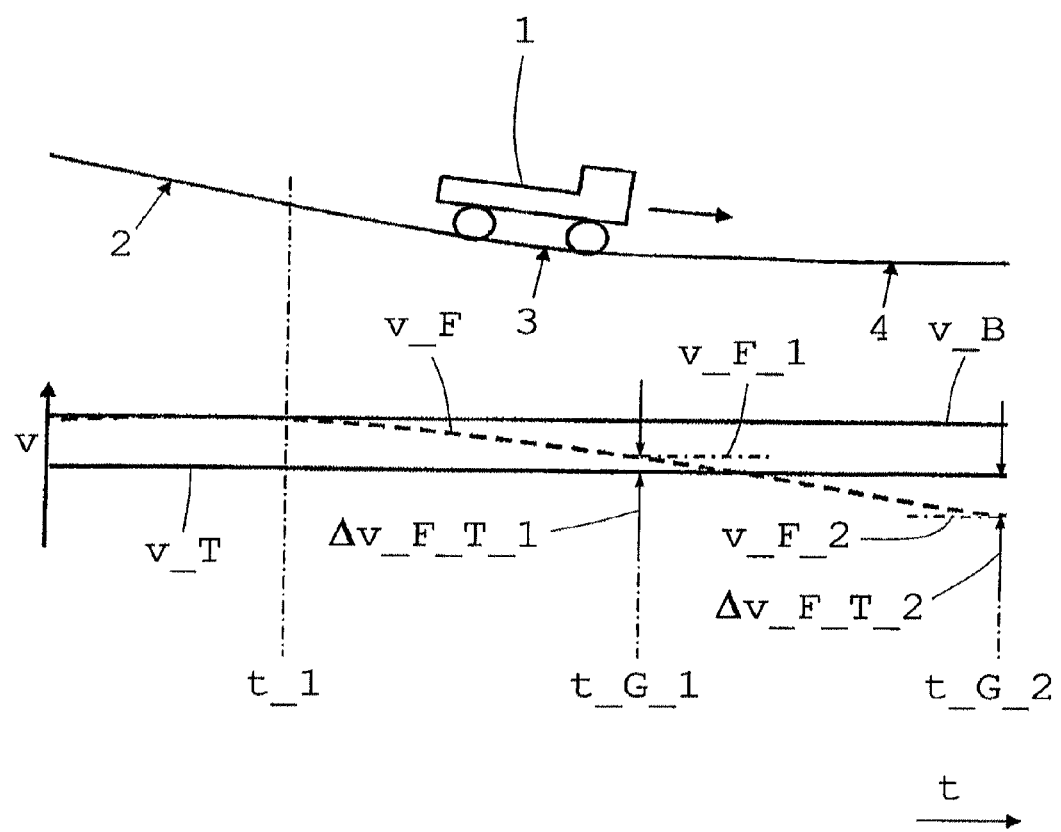

METHOD FOR CONTROLLING A ROLLING OR COASTING FUNCTION OF A VEHICLE

This application is a National Stage completion of PCT/EP2010/065153 filed Oct. 11, 2010, which claims priority from German patent application serial no. 10 2009 046 340.2 filed Nov. 3, 2009.

FIELD OF THE INVENTION

The invention relates to a method for controlling a rolling or coasting function of a vehicle.

BACKGROUND OF THE INVENTION

Saving energy and cost in the powertrain and reducing pollution from exhaust gas and noise emissions are current goals in vehicle development. In suitable driving situations, vehicles can be temporarily advanced in a rolling or coasting mode without being driven. When a motor vehicle is in rolling mode, the internal combustion engine can turn over with minimized consumption and low emissions while idling as the vehicle rolls with a disengaged drive train. If the internal combustion engine is turned off in such a driving situation, to further increase the resulting savings, the vehicle moves in a so-called coasting mode. These functions are already known.

Depending on the available drive train components and transmission design, the flow of power can be interrupted by shifting the transmission into neutral and/or by disengaging the start-off or lock-up clutch once rolling or coasting is possible. The rolling or coasting mode is ended by engaging the drive train or shifting into a gear.

It has proven to be problematic to identify suitable driving situations for activating the rolling or coasting function, simultaneously avoiding unnecessary interruptions in the flow of power, and terminating the function at the right time. If the function is terminated too early, available potential momentum can remain largely unused, and the resulting savings is lost. On the other hand, if the topography subsequently rises, especially for heavy commercial vehicles, the function can lead to insufficient traction and a slowdown of driving with downshifting to the extent of having to start off again. In addition, the driving comfort, wear of the related components in the drive train and driving safety need to be taken into account.

However, known methods for controlling the rolling or coasting function frequently incorrectly identify situations for interrupting and suspending the interruption of the flow of the force due to a somewhat unfiltered or insufficient analysis of the topographic conditions of the roadway, and/or an insufficient analysis of the current driving status of the motor vehicle, or the situations are too complex, and this can cause misinterpretations with activations and deactivations of the rolling or coasting function that, depending on the situation, are undesirable and possibly counterproductive for the driver, or with a rather inefficient exploitation of suitable rolling or coasting situations.

Furthermore, it is known that modern vehicles are increasingly being equipped with automatic vehicle speed control functions or vehicle speed functions and distance control functions for reasons of comfort, traffic, and vehicle safety. Such systems are known as so-called Tempomat/Bremsomat systems for example, and are available for passenger cars and commercial vehicles. They make it possible to maintain a desired speed dictated by the driver or when expanded as an ACC (adaptive cruise control) or ADR (automatic distance regulation), create a monitoring area in front of or around the vehicle with the assistance of sensors such as radar, infrared, video or ultrasound, whereby at least the distance from the preceding vehicle is adapted by means of a Bremsomat by automatically letting up on gas or braking.

In particular, known Tempomat/Bremsomat systems in commercial vehicles react by braking with an available auxiliary brake system when deceleration is required on a gradient and/or to adapt the distance from the preceding vehicle, such as an input-side or output-side hydrodynamic or electrodynamic retarder and/or the service break, where the retarder is preferably used. If acceleration is needed to maintain or reach a specified Tempomat speed, these systems request engine torque.

A method is known from DE 102 21 701 A1 to control a rolling or coasting function for a motor vehicle with an automatic transmission. With the known method, a quantity representing the vehicle speed, brake actuation and/or actuation of a fuel supply measuring element and an operating state of the internal combustion engine are detected. A clutch device is disengaged, thereby interrupting the flow of force in the drive train when neither the gas pedal, nor the fuel supply measuring element, nor the brake pedal are actuated while the internal combustion engine is running and a specific vehicle speed is exceeded. After the clutch is disengaged, the transmission is shifted into neutral and the vehicle is therefore in a rolling mode.

When the gas pedal or the brake pedal is actuated, or variables having like effect are changed, the clutch is re-engaged, thereby terminating the rolling mode. Before the clutch is engaged, the rotational speeds of the internal combustion engine and a transmission input shaft are first synchronized to return from rolling mode to regular drive as smoothly as possible. The disengagement of the clutch and hence rolling mode are prevented when a probable need for braking is assumed. This can, for example, be the case while traveling downhill, when the gas pedal is suddenly released, or when a sporty driving program is selected.

A method is known from DE 10 2007 001 936 A1 to control a shifting clutch of an automatic transmission of a motor vehicle in which hill detection and neutral idle controls are continuously evaluated and checked. The method is executed in order to save fuel in a neutral transmission position during idling states of the internal combustion engine, while stopping at a signal, or in stop-and-go operation. At the same time, the vehicle is prevented from rolling backward on a slope when there is not enough brake pressure to hold the vehicle when the transmission shifts into neutral.

Certain initial conditions have to be satisfied for such a neutral idle control, that is, situation-controlled neutral shifting, which includes the evaluation of a hill detection flag and a hill counter. A hill detection flag can be set when there is a corresponding evaluation using hill detection, or a hill counter can be incremented. This is the case when the transmission is in a forward gear, the rotational speed of the transmission output shaft is greater than a specified output shaft rotational speed limit, a throttle position of the internal combustion engine is less than a specified throttle position limit, a brake status indicates that the vehicle brake is actuated, and the transmission temperature is within a permissible range.

Rollback-free neutral idle shifting is possible when the current counter reading is less than a specified counter limit, or when the brake pressure is greater than a precalculated brake pressure limit when the counter reading is above this counter limit, or if the brake pressure is not available and the counter reading is greater than the counter limit when a hill detection flag is set.

DE 10 2004 017 115 A1 makes known a method for the automatic driving speed control or driving speed and distance control for a vehicle comprising an automatic or automated transmission, in which the driving speed can vary within the range of a preselected target speed. In that particular case, an acceleration phase is followed by a roll-out phase in which the flow of power in the drive train can be interrupted to save fuel. Topographical data, data from a monitoring device pertaining to the immediate vehicle surroundings, and/or certain vehicle parameters can be taken into account via a navigation device in the sequence of acceleration and roll-out phases. The acceleration phases can be supported by an electric motor which is present in addition to an internal combustion engine.

WO 2003/037672 makes known a multi-speed transmission, in particular for heavy commercial vehicles, which is shifted into neutral, i.e. into a rolling mode, when a low-consumption driving state is detected. A low-consumption driving state is detected and the neutral position is attained via shifting when a target speed is specified and the driving speed would decrease without the rolling mode. This is assumed, in particular, when neither the gas pedal nor the brake pedal is pressed, and equivalent variables do not change. A supplemental brake system which can be requested in rolling mode is provided for safety reasons. The gear that is currently engaged is also taken into consideration.

In addition, a method is known from WO 2009/037167 A1 for controlling an automated or automatic multi-step transmission of a motor vehicle, especially a heavy commercial vehicle, in which a higher gear is shifted into before the gradient taper or before starting traction mode, that is, a thrust upshift is executed, to reduce fuel consumption while driving down a slope and then leaving the slope instead of only upshifting after leveling out or transitioning from thrust mode to traction mode as usual.

The current roadway gradient is determined in a specified interval and a function is activated when driving downhill to identify the gradient taper to automatically upshift as early as possible. The rotational speed of the drive motor and possibly of an active constant braking device is thereby reduced which could cause the motor vehicle to accelerate due to the lower motor drag torque and possibly lower retarder braking torque, thereby causing the traction mode to start comparatively later. The higher gear is selected so that the motor vehicle only accelerates slightly, and the driver can control the situation safely at all times.

The gradient taper is identified when the just traveled gradient decreases steadily over a specific number of intervals and falls below a threshold. In addition, various criteria can be provided such as the actuation of the service brake, excessive vehicle acceleration, an excessively steep gradient, a particularly heavy load, the operation of an auxiliary brake at its load limit or falling below a target speed or falling below a safe distance regulated by an active Tempomat/Bremsomat that, for reasons of safety, lead to the blocking of thrust upshifting.

The known methods have various options for reducing fuel consumption with the assistance of driving with flywheel momentum. However, a person skilled in the art would not find any suggestions therein of terminating a rolling or coasting function by considering the effect of a vehicle's speed regulating device.

SUMMARY OF THE INVENTION

Against this background, the object of the invention is to present a method for controlling a rolling or coasting function of a motor vehicle with an automatic or automated transmission and a speed control device by means of which a rolling or coasting situation can be exploited with maximum efficiency and nonetheless terminated safely and comfortably.

The invention is based on the knowledge that, when transitioning from a downhill gradient to a flat area or a rise after a rolling or coasting situation while driving a vehicle that has a rolling or coasting function and a driving speed control device or a Tempomat/Bremsomat system, the restoration of the flow of power in the drivetrain should be oriented around the selected speed of the Tempomat, but it should in contrast be able to be handled flexibly with the assistance of transmission controls taking into account the current parameters of the vehicle and/or the topography of the traveled road.

The invention is accordingly based on a method for controlling a rolling or coasting function of a vehicle, such as a commercial vehicle, with a drive train having a drive motor, an automatic or automated transmission controllable by means of transmission controls, with controllable shifting means for interrupting the flow of power in the drive train, and with a driving speed control device, wherein the flow of power in the drivetrain is interrupted in a suitable driving situation. To achieve the intended object, the invention proposes restoring the flow of power in the drive train depending on a selectable speed difference between the current vehicle speed and a bottom speed limit specified by the driving speed control device.

A rolling function or rolling mode is understood to mean driving a vehicle with the drive train disengaged, i.e. non-driven forward driving or driving via flywheel momentum, with the drive engine running. A coasting function or coasting mode is understood to mean driving a vehicle with the drive train disengaged and the drive engine shut off.

A driving speed control device is understood to be a vehicle system having both a so-called Tempomat and a so-called Bremsomat for drive or braking interventions. Such a system is accordingly also called a Tempomat/Bremsomat system. The system can also have a distance control device.

Corresponding to the usual conventions regarding signs, gradients are considered negative slopes, decelerations are considered negative acceleration, and the resulting driving downhill force is considered negative resistance.

Since the Tempomat/Bremsomat function executes interventions in the powertrain which affect speed and/or safety, and since the rolling or coasting function enables the drive train to be shifted into neutral or the flow of power to be interrupted which affects consumption, it has proven advantageous to coordinate as needed both functions, if available, to achieve effective and comfortable driving but without abandoning their independent operations. This is especially desirable because the Tempomat/Bremsomat is generally only turned on in response to a driver's wish and/or under certain parameters, whereas a fuel-saving shift into neutral or clutch disengagement can be automatically activated or deactivated depending on the situation. If a Tempomat/Bremsomat system is available and active, the coordination of the Tempomat/Bremsomat functions and the rolling or coasting function can be advantageously controlled by existing, correspondingly adapted transmission controls.

The rolling or coasting situations can be controlled by means of a transmission control unit that detects relevant signals and evaluates data, and subsequently issues commands to instigate, execute, block and terminate the rolling or coasting function. In vehicles having Tempomat or Bremsomat devices, the software in the controllers for these systems does not have to be changed, which has an economical effect.

The rolling or coasting function can be activated when the current roadway slope allows driveless forward travel, or driving with flywheel momentum. In a situation relevant to the method according to the invention, the vehicle is first on a section of gradient with a subsequent transition to a flat area or rise, and it is switched to a rolling/coasting mode during this driving situation. The situationally correct activation of the rolling or coasting function on a gradient taper is treated in another patent application by the applicant.

The driveless, rolling vehicle then loses speed from the driving resistance resulting from the air resistance, rolling resistance, slope resistance and acceleration resistance when the road topography transitions to a flat area or begins to rise again. To engage the drive train, the originally disengaged gear, or another suitable gear, is engaged according to the invention in the transmission which previously shifted into neutral depending on a set Tempomat speed or a lower speed limit of the speed controlling device and the current vehicle speed, and/or a clutch that was previously disengaged to disconnect the drive motor from the drive train is re-engaged.

By means of the method according to the invention, the drive train can be re-engaged at a suitable time for comfortably continuing driving which is also favorable in terms of consumption, thus allowing the drive torque to be transmitted from the drive motor, via the transmission, to the vehicle wheels.

In particular, the difference in speed between the current vehicle speed and Tempomat speed at which the flow of power is restored can be selected depending on the current vehicle acceleration. The vehicle acceleration and speed difference can be advantageously assigned as desired. The flow of power can accordingly be restored at a vehicle speed above or below the Tempomat speed.

Accordingly, a request of engine torque from the Tempomat can be temporarily blocked by the transmission controls to permit a relatively large loss of speed by the vehicle. This is especially advantageous when the vehicle is moving with a comparatively low deceleration (negative acceleration), and a gentle down-coasting in a flat area is identified which is a particularly suitable driving situation for the rolling or coasting function. Consequently, the gear is correspondingly engaged later, or the start-up clutch is engaged later, below the Tempomat speed.

For example in the case of negative vehicle acceleration below a threshold, that is, in the case of relatively slow vehicle deceleration, the amount of the difference in speed at which the flow of power is restored can correspond to the size of the difference in speed between an upper speed limit specified by the vehicle speed control device, that is, a Bremsomat speed, and the lower speed limit, that is, the Tempomat speed. A rolling or coasting situation can thereby be essentially completely exploited to achieve high fuel savings.

On the other hand, a very low difference in speed can be selected as the threshold for ending the rolling or coasting mode so that the flow of power results at a vehicle speed close to the Tempomat speed.

The difference in speed can be negative, i.e., the gear can be reengaged or the clutch can be engaged at a time at which the driving speed has fallen slightly below the Tempomat speed, or it can conversely be positive so that the gear is reengaged, or the clutch is engaged slightly above the Tempomat speed.

In particular, the difference in speed between the vehicle speed and Tempomat speed at which the flow of power is restored can assume a value close to zero in the case of negative vehicle acceleration above a threshold. For example when there is strong deceleration (negative acceleration) of the vehicle in which the vehicle is not expected to gently coast down and the downhill grade is instead expected to abruptly end with a short need for torque, the flow of power can accordingly be restored prematurely to make available, if necessary, directly accessible traction for a subsequent rise. Of course in a special case, the drive train can also be engaged at a time in which the current driving speed corresponds to the Tempomat speed.

In addition, a topographical road section can be comparably inferred by evaluating the current roadway slope that can be determined by sensors and if applicable by a suitable calculation, and/or the driving resistance resulting from the air resistance, rolling resistance, (negative) slope resistance and (negative) acceleration resistance, which makes a rather low or rather large loss of speed appear recommendable until the engagement of the drive train.

The time at which the drive train engages is accordingly determined by the current difference in speed between the vehicle speed and Tempomat speed, and the differential speed threshold is freely selectable. To determine a favorable point in time, the vehicle acceleration, and/or the roadway slope, and/or the driving resistance and, if applicable, other parameters are evaluated, and then the differential speed threshold is determined as a function of these values at which the rolling or coasting function is deactivated.

The method therefore makes it possible to variably re-engage the drive train or re-engage the gear after rolling or so-called coasting of the vehicle with a disengaged drive train depending on the situation, wherein the Tempomat is used as an orientational speed with an upward or downward, greater or lesser deviation depending on the situation and/or other specified parameters. This allows for the effective exploitation of the rolling or coasting function to save fuel, and the driving comfort and driver's wish for a certain propulsion is at least largely taken into consideration.

BRIEF DESCRIPTION OF THE DRAWINGS

A drawing of an exemplary embodiment accompanies the description to illustrate the invention. In the drawing, the sole FIGURE portrays a schematic representation of the situational termination of a rolling or coasting function in a commercial vehicle.

DETAILED DESCRIPTION OF THE PREFERRED EMBODIMENTS

The commercial vehicle possesses a drive train with an internal combustion engine and an automatic or automated single or multi-group transmission that can be controlled by transmission controls. Furthermore, a driving speed control device is provided. Vehicles with such drive trains are known per se; consequently, the following description is restricted to a method according to the invention for controlling a rolling or coasting function of such a vehicle.

The method is essentially based on the fact that the flow of power in the drive train is restored after a rolling or coasting situation depending on a selectable speed difference $\Delta v\_F\_T = v\_F - v\_T$ between the current vehicle speed $v\_F$ and a lower speed limit set by the driving speed control device, that is, a Tempomat speed $v\_T$.

Accordingly, the commercial vehicle 1 in the single FIGURE of the drawing is on a slight downhill grade 2 with a relatively low negative slope $\alpha\_Fb$ that transitions, via a gradient taper 3, into a flat area 4. The transmission has been shifted into neutral by the transmission controls so that the commercial vehicle 1 moves in rolling mode without being driven. Due to the driving resistance $F\_W$, i.e. the sum of the air and rolling resistance and slope and acceleration resistance, negative vehicle acceleration $a\_F$ takes effect that causes an increasing loss of speed.

FIG. 1 shows an upper speed limit v_B and a lower speed limit v_T that are set beforehand as a Bremsomat speed v_B or a Tempomat speed v_T by a driving speed control device designed as a Tempomat/Bremsomat system. A braking device of the vehicle 1 is controlled by the Tempomat/Bremsomat when the vehicle accelerates above the Bremsomat speed v_B to maintain or keep the driving speed v_F from rising further, and an engine torque is requested when the vehicle speed v_F falls below the Tempomat speed v_T so that the vehicle 1 will continue to operate at least at this vehicle speed v_F. Furthermore, a time characteristic of the vehicle speed v_F passing through the topographical driving situation is illustrated as a dashed line. A loss of speed begins at an assumed time t_1 and starts to increase upon rolling into the flat area 4.

To illustrate the invention, two additional points in time t_G_1 and t_G_2 are marked at which a gear of the vehicle transmission could be re-engaged. In a first example, a rather strong deceleration (negative acceleration a_F) of the vehicle 1 from driving resistance is assumed, and therefore only a relatively low loss of speed is permitted in comparison to the Bremsomat speed v_B. Accordingly, when there is a very small positive difference in speed $\Delta v\_F\_T\_1 = v\_F\_1 - v\_T$ at shifting time t_G_1, the gear is re-engaged before the Tempomat requests torque. Traction is correspondingly available early on which may be required for a coming rise. However, the fuel saved from the rolling phase is rather low.

In the second example, a rather slight deceleration (negative acceleration a_F) is assumed. A relatively large loss of speed, even below the Tempomat speed v_T, is therefore permitted. Consequently, the gear is only re-engaged when there is a large negative difference in speed $\Delta v\_F\_T\_2 = v\_F\_2 - v\_T$ at shifting time t_G_2. At time t_G_2 at which the gear is engaged below the Tempomat speed v_T, the vehicle 1 has already been rolling a certain distance in flat area 4. This yields relatively high fuel savings. Due to the length of the flat area 4, traction is required for continued driving at a comparatively later time.

The two described scenarios are only to be understood as examples. Since the differential speed threshold is freely selectable, a person skilled in the art can specify other or different useful decisive times for engaging the drive train in the transmission controls.

LIST OF REFERENCE CHARACTERS

1 Commercial vehicle
2 Downhill grade
3 Gradient taper
4 Flat area
a_F Vehicle acceleration
α_Fb Roadway slope
F_W Driving resistance
t Time
t_1 Point in time
t_G_1 Point in time
t_G_2 Point in time
v Speed
v_B Bremsomat speed
v_F Vehicle speed
v_F_1 Vehicle speed at time t_G_1
v_F_2 Vehicle speed at time t_G_2
v_T Tempomat speed
$\Delta v\_B\_T$ Difference in speed
$\Delta v\_F\_T$ Difference in speed
$\Delta v\_F\_T\_1$ Difference in speed at time t_G_1
$\Delta v\_F\_T\_2$ Difference in speed at time t_G_2

The invention claimed is:

1. A method of controlling a rolling or a coasting function of a vehicle having a drive train comprising a drive motor, one of an automatic or an automated transmission that is controllable by transmission controls, a controllable shifting means for interrupting a flow of power in the drive train, and a driving speed control device, the method comprising the steps of:
   interrupting the flow of power in the drive train in a suitable driving situation,
   restoring the flow of power in the drive train, depending on a selectable difference in speed ($\Delta v\_F\_T$) between a current vehicle speed (v_F) and a lower speed limit (v_T) set by the driving speed control device, at a vehicle speed (v_F) above the lower speed limit (v_T).

2. The method according to claim 1, further comprising the step of selecting the difference in speed ($\Delta v\_F\_T$), at which the flow of power is restored, depending on a current vehicle acceleration (a_F).

3. The method according to claim 2, further comprising the step of, when the current vehicle acceleration (a_F) is negative above a threshold, selecting the difference in speed ($\Delta v\_F\_T$) at which the flow of force is restored as a value close to zero.

4. The method according to claim 2, further comprising the step of, when the current vehicle acceleration (a_F) is negative below a threshold, associating an amount of the difference in speed ($\Delta v\_F\_T$), at which the flow of power is restored, approximately to a difference in speed ($\Delta v\_B\_T$) between an upper speed limit (v_B), set by the vehicle speed control device, and the lower speed limit (v_T).

5. The method according to claim 1, further comprising the step of selecting the difference in speed ($\Delta v\_F\_T$), at which the flow of power is restored, depending on a current vehicle roadway slope (α_Fb).

6. The method according to claim 1, further comprising the step of selecting the difference in speed ($\Delta v\_F\_T$), at which the flow of power is restored, depending on a current driving resistance (F_W).

7. The method according to claim 1, further comprising the step of restoring the flow of power, via the transmission controls, by at least one of engagement of a gear after a preceding shift to neutral, and by engagement of a clutch device after the drive motor has been previously disconnected from the drive train.

8. The method according to claim 1, further comprising the steps of at least one of shifting into neutral and disconnecting the drive motor from the drive train, preceding the restoration of the flow of power, as a result of a driving situation in which a roadway topography transitions from a gradient (2) to either a flat area (4) or a roadway rise.

9. The method according to claim 1, further comprising the step of at least incorporating the method in a commercial vehicle (1).

10. The method according to claim 1, further comprising the step of incorporating the method in a commercial vehicle (1).

11. A method of controlling a rolling or a coasting function of a vehicle having a drive train comprising a drive motor, one of an automatic or an automated transmission that is controllable by transmission controls, a controllable shifting means for interrupting a flow of power in the drive train, and a driving speed control device, the method comprising the steps of:
   interrupting the flow of power in the drive train in a desired driving situation, restoring the flow of power in the drive train, depending on a selectable difference in speed ($\Delta v\_F\_T$) between a current vehicle speed ($v\_F$) and a lower speed limit ($v\_T$) set by the driving speed control device, at a vehicle speed ($v\_F$) below the lower speed limit ($v\_T$).

12. The method according to claim 11, further comprising the step of selecting the difference in speed ($\Delta v\_F\_T$), at which the flow of power is restored, depending on a current vehicle acceleration ($a\_F$).

13. The method according to claim 11, further comprising the step of, when a current negative vehicle acceleration ($a\_F$) is negative above a threshold, selecting the difference in speed ($\Delta v\_F\_T$) at which the flow of force is restored as a value close to zero.

14. The method according to claim 11, further comprising the step of, when a current negative vehicle acceleration ($a\_F$) is negative below a threshold, associating an amount of the difference in speed ($\Delta v\_F\_T$), at which the flow of power is restored, approximately to a difference in speed ($\Delta v\_B\_T$) between an upper speed limit ($v\_B$), set by the vehicle speed control device, and the lower speed limit ($vT\_T$).

15. The method according to claim 11, further comprising the step of selecting the difference in speed ($\Delta v\_F\_T$), at which the flow of power is restored, depending on a current vehicle roadway slope ($\alpha\_Fb$).

16. The method according to claim 11, further comprising the step of selecting the difference in speed ($\Delta v\_F\_T$), at which the flow of power is restored, depending on a current driving resistance ($F\_W$).

17. The method according to claim 11, further comprising the step of restoring the flow of power, via the transmission controls, by at least one of engagement of a gear after a preceding shift to neutral, and by engagement of a clutch device after the drive motor has been previously disconnected from the drive train.

18. The method according to claim 11, further comprising the steps of at least one of shifting into neutral and disconnecting the drive motor from the drive train, preceding the restoration of the flow of power, as a result of a driving situation in which a roadway topography transitions from a gradient (2) to either a flat area (4) or a roadway rise.

* * * * *